United States Patent Office 2,806,038
Patented Sept. 10, 1957

2,806,038

HYDROXYLATED DERIVATIVES OF 2,4b-DI-METHYL - 2 - HYDROXY - 7 - OXOPOLYHYDRO-PHENANTHRENE - 1 - PROPIONIC ACID-δ-LAC-TONES

George M. Picha, Skokie, Ill., assignor to G. D. Searle & Co., Chicago, Ill., a corporation of Illinois No Drawing. Application May 7, 1954,
Serial No. 428,382

3 Claims. (Cl. 260—343.2)

The present invention relates to a new group of lactones and, specifically, to a method for the biochemical oxidation of 2,4b-dimethyl-2-hydroxy-7-oxo-1,2,3,4,4a,4b,5,6, 7,9,10,10a-dodecahydrophenanthrene - 1 - propionic acid δ-lactone and hydroxy derivatives produced thereby.

It has been discovered that subjecting a 2,4b-dimethyl-2-hydroxy-7-oxo - 1,2,3,4,4a,4b,5,6,7,9,10,10a - dodecahydrophenanthrene-1-propionic acid δ-lactone of the structural formula

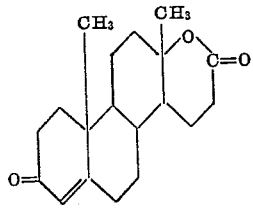

to the action of mammalian adrenal glands yields valuable hydroxylated derivatives.

The compounds thus obtained possess valuable pharmaceutical and especially cardiovascular, anti-inflammatory and hormonal properties. More specifically, they produce the therapeutic activities of the naturally occurring adrenocorticoid hormones but lack some of the secondary effects which limit the therapeutic applicability of these naturally occurring hormones. They are particularly valuable in the treatment of such conditions as allergic arteritis. Further, these compounds are valuable as intermediates in the organic synthesis of other medicinally valuable compounds. Thus a newly introduced 11-hydroxy group can be oxidized by means of chromic acid to yield the corresponding ketone. Further, this newly introduced 11-hydroxy group can be esterified by treatment in pyridine with an anhydride of a lower alkanoic acid such as acetic anhydride.

The following examples illustrate in detail some of the preferred methods of practicing the invention. However, it is not to be construed as limited thereby in spirit or in scope since it will be obvious to those skilled in the art that numerous modifications in materials and methods can be practiced without departing from the invention. In the examples, amounts of materials are indicated as parts by weight.

Example 1

A solution of 1 part of 17a-oxa-D-homo-4-androstene-3,17-dione (testololactone) in 5000 parts of citrated bovine blood and 5000 parts of citrated calcium-free Tyrode solution containing 50 parts of glucose is perfused 7 times through 10 bovine adrenal glands lacerated at the surface at a temperature of 36.5 to 37.6° C. in the course of 3 hours. The perfusate is then extracted with isopropyl acetate. The extract is washed with water, dried by azeotropic distillation and concentrated at reduced pressure in a nitrogen atmosphere to a residue of about 50 parts. The residue is diluted with 900 parts of benzene and poured onto a chromatography column containing 100 parts of silica gel. The column is washed with 500 parts of a 10% and 3000 parts of a 20% solution of ethyl acetate in benzene to remove unreacted testololactone and impurities. Elution with a 25% solution of ethyl acetate in benzene yields first eluates which, on concentration and recrystallization of the residue from ethyl acetate, yield needles melting at about 267–270° C. The ultraviolet absorption spectrum of this product shows little absorption in the region of 240 millimicrons. An intense green fluorescence is obtained with sulfuric acid; but while dihydrocortisone gives an almost immediate green fluorescence, several minutes are required for the full development of color in the case of this compound. The compound has an empirical formula $$C_{19}H_{28}O_4$$

It is 11β-hydroxy-17a-oxa-D-homoandrostane-3,17-dione of the structural formula

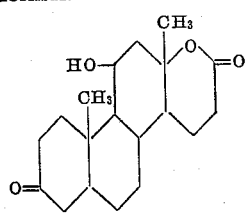

Further elution of the chromatography column with a 25% solution of ethyl acetate in benzene yields the principal product of the adrenal perfusion. This product, obtained by concentration of the eluates and recrystallization, crystallizes from ethyl acetate or from acetone in colorless, thick, dense rhombohedra melting at about 264–267° C. On crystallization from ethanol or mixtures of ethanol and ethyl acetate, the product is obtained in cottony needles. The specific rotation of an 0.9% acetone solution $\alpha_D^{25}$ is $+41°$. The ultraviolet absorption spectrum of a methanolic solution shows a maximum at 240 millimicrons with a molecular extinction coefficient of 16,700. Infrared absorption maxima in chloroform are observed at about 2.75, 2.82, 5.84, 6.03, 6.19, 6.92, 7.23, 7.40, 7.50, 7.68, 7.82, 8.10, 8.45, 8.63, 9.09, 9.30, 9.51, 9.82, 10.15, 11.45, and 11.80 microns. With sulfuric acid a similar green fluorescence is obtained after several minutes as in the case of the foregoing androstane analog. The empirical formula is $$C_{19}H_{26}O_4$$

It is 11β-hydroxy-17a-oxa-D-homo - 4 - androstene-3,17-dione of the structural formula

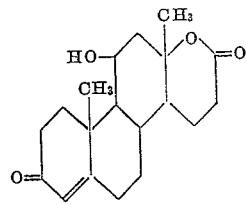

Example 2

2 parts of 11β-hydroxy-17a-oxa-D-homo-4-androstene-3,17-dione are dissolved in 70 parts of glacial acetic acid by prolonged shaking at room temperature. To this solution is added a solution of 3 parts of chromic anhydride, 5 parts of water and 20 parts of glacial acetic acid. The mixture is quickly cooled to about 12° C. and maintained at that temperature for 2 hours. It is then permitted to warm to 20° C. in the course of a half hour. The oxidation mixture is then treated with a solution of 9 parts of sodium sulfite in 150 parts of water and evaporated at room temperature. The slightly wet residue is stirred with 80 parts of water until no more of the solid enters into solution. The suspension is maintained at 0° C. for 3 hours. The solid product is collected on a filter, washed well with water, air-dried and recrystallized twice from ethyl acetate. Thus, thick, white needles or rods are obtained which melt at about 238–241° C. The ultraviolet absorption spectrum of a methanolic solution shows a maximum at about 238 millimicrons with a molecular extinction coefficient of 17,000. The infrared absorption spectrum in chloroform solution shows maxima at about 5.80, 6.02, 6.18, 6.90, 7.24, 7.42, 7.68, 8.02, 8.64, 9.05, 9.62, 9.90, 10.15, 10.50, and 11.48 microns. The specific rotation of a 1% acetone solution $\alpha_D^{25}$ is $+92.5°$. This compound is 17a-oxa-D-homo-4-androstene-3,11,17-trione.

*Example 3*

A solution of 67 parts of 11β-hydroxy-17a-oxa-D-homo-4-androstene-3,17-dione in 550 parts of pyridine and 500 parts of acetic anhydride is heated on a steam bath for 3 hours, cooled and cautiously diluted with water to a final volume of 20,000 parts. After evaporation of about 10% of this solution, unconverted 11β-hydroxy-17a-oxa-D-homo-4-androstene-3,17-dione precipitates. This precipitate is removed by filtration and the filtrate is evaporated to dryness. The solid residue is then dissolved in 100,000 parts of an 11% solution of ethyl acetate in benzene, and applied to a silica gel chromatography column. The column is first washed with a 14% solution of ethyl acetate in benzene. Elution with a 17% solution of ethyl acetate in benzene yields first an oil and then a crystalline material, which is recrystallized from a mixture of ethyl acetate and petroleum ether. It is 11β-acetoxy-17a-oxa-D-homo-4-androstene-3,17-dione. The compound has the structural formula

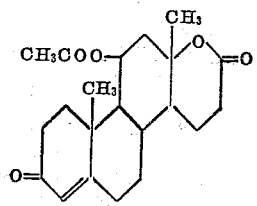

Subsequent elution with 20% and 25% solutions of ethyl acetate in benzene yields more starting material.

I claim:
1. 11β-hydroxy-17a-oxa-D-homo-4-androstene-3,17-dione.
2. 11β-hydroxy-17a-oxa-D-homoandrostane-3,17-dione.
3. A member of the class consisting of 11β-hydroxy-17a-oxa-D-homo-4-androstene-3,17-dione and 11β-hydroxy-17a-oxa-D-homoandrostane-3,17-dione.

References Cited in the file of this patent

UNITED STATES PATENTS

| | | |
|---|---|---|
| 2,403,683 | Reichstein | July 9, 1946 |
| 2,499,247 | Jacobsen et al. | Feb. 28, 1950 |
| 2,499,248 | Pincus et al. | Feb. 28, 1950 |
| 2,554,882 | Reichstein | May 29, 1951 |
| 2,666,015 | Pincus et al. | Jan. 12, 1954 |
| 2,666,016 | Hechter et al. | Jan. 12, 1954 |
| 2,676,904 | Jeanloz | Apr. 27, 1954 |

FOREIGN PATENTS

| | | |
|---|---|---|
| 503,509 | Belgium | May 10, 1951 |

OTHER REFERENCES

Levy et al.: J. Biol. Chem. 171, pp. 71–79 (1947).